Jan. 17, 1967 R. P. MASSEY 3,299,370

TRANSISTOR BRIDGE CONVERTER

Filed Dec. 24, 1959 2 Sheets-Sheet 1

INVENTOR
R. P. MASSEY
BY *F. P. Priolo*
ATTORNEY

INVENTOR
R. P. MASSEY
BY V. P. Briolo
ATTORNEY

United States Patent Office 3,299,370

Patented Jan. 17, 1967

3,299,370

TRANSISTOR BRIDGE CONVERTER

Richard P. Massey, Westfield, N.J., assignor to Bell Telephone Laboratories, Incorporated, New York, N.Y., a corporation of New York Filed Dec. 24, 1959, Ser. No. 861,947
27 Claims. (Cl. 331—113)

Figure 1:
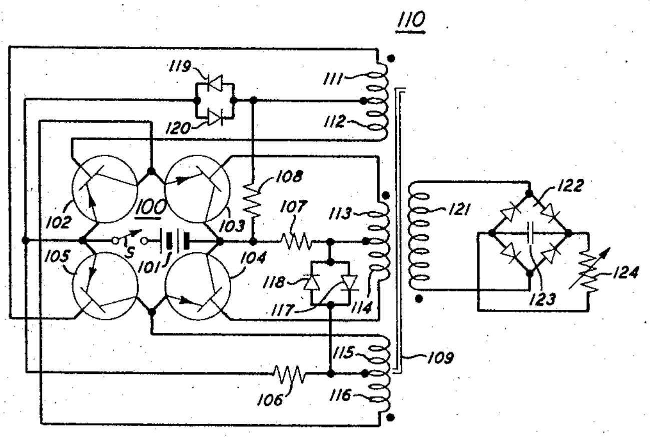

This invention relates to power supply systems, and more particularly, to a system for converting direct current to alternating current which, in turn, may be rectified.

In many electrical and electronic systems ranging in scope from high-fidelity audio to guided missiles, it is important to employ power systems which amplify direct current and supply it at a constant magnitude to a given load. Such power supply systems must possess an extremely high degree of reliability with a relatively high order of absolute current stabilization. Power supply systems of the transistor core converter type, which are small, light, efficient, and require no maintenance, possess the required degree of reliability and stability and, therefore, qualify for broad applications.

Converter circuits, such as described in United States Patents Nos. 2,783,384 and 2,821,639, generally employ a plurality of transistors and a saturable transformer for converting direct current to alternating current which, in turn, may be rectified. The transistors function as automatic switches, i.e., conductive or non-conductive, to complete circuits for supplying current from a direct-current source to a portion of a transformer winding alternately in opposite directions.

In the two-transistor configuration of United States Patent No. 2,783,384, the voltage across the emitter-collector path of the transistor which is not conducting is substantially twice the voltage of the supply source. Therefore, to avoid damage to each of the transistors, the voltage of the direct-current source must be equal to or less than half the maximum safe voltage which can be applied across the emitter-collector path of each of the transistors. This voltage limitation of the direct-current supply source limits the power output of the converter, the output power being substantially proportional to the input supply voltage.

In a bridge-type transistor core converter, such as the one described in United States Patent No. 2,821,639, the voltage of the direct-current source and, therefore, the power output of the converter, may be increased by supplying current from a direct-current source to a winding or winding portion of a saturable inductance device, such as a saturable transformer, through the collector-emitter paths of a plurality of transistors in series. When two transistors in series, for example, are employed in each circuit for supplying current to the winding, the voltage across the collector-emitter path of each of the two transistors which are non-conducting, is substantially equal to the voltage of the supply source. In this case, to avoid damage to the transistors, it is only necessary to limit the direct-current voltage source to a value which is equal to or less than the maximum safe voltage which can be applied across the collector-emitter path of each transistor. In applying this general principle to extended bridge-type converters it may be stated that when $2n$ similar transistors are provided in each circuit for supplying current to the windings of the saturable inductance device, the voltage of the direct-current supply source may be increased to $n$ times the maximum safe voltage which can be applied across the collector-emitter path of each transistor.

In addition to providing increased power output, bridge configurations provide greater transformer winding utilization.

The converters discussed above have, however, been seriously limited in the starting capability of the push-pull mode of oscillation under other than light loads. Under small or light load conditions, the inherent slight differences in the characteristics of the components provide a sufficient unbalance to start the push-pull oscillations of the circuit. For example, although the transistors are all of the same conductivity type and have the same rating, the current gain of any one of the transistors will not be equal to the gain of any of the other transistors. The transistor with the higher current gain will be faster acting, that is, the current in the emitter-collector path will increase at a faster rate, which, as discussed later, is all that is necessary to start the converter's push-pull mode of operation. However, transistor characteristic variations due to temperature effects have made this starting method unreliable and unsatisfactory. For other than light loads, separate starting means have been employed. One common practice is to use a separately-excited converter, i.e., a converter controlled by a separate alternating-current driving signal or another converter. In general, it is desirable to reduce the number of required transistors for self-excited converter configurations while maintaining the advantages of reliable starting under all loads, at all temperatures, and with maximum transformer winding utilization.

It is, therefore, an object of this invention to provide a symmetrical self-starting bridge converter with an unlimited voltage range.

A further object of this invention is to provide a self-starting, thermally stabilized symmetrical bridge converter.

A further object of this invention is to provide a self-starting, thermally stabilized bridge converter with decreased transistor turn-off or decay time.

A further object of this invention is to provide an improved self-starting transistor oscillator.

It has been found that these objectives may be achieved by employing a transistor starting bias circuit comprising networks which includes asymmetrically conducting devices, proportioned resistors and transformer winding portions.

A feature of this invention resides in the use of proportioned starting networks which interconnect portions of the saturable transformer windings.

Another feature of this invention contemplates the interchangeability or substitution of proportioned starting networks for saturable transformer windings and vice-versa, without appreciably changing the performance of the configuration.

Figure 2:
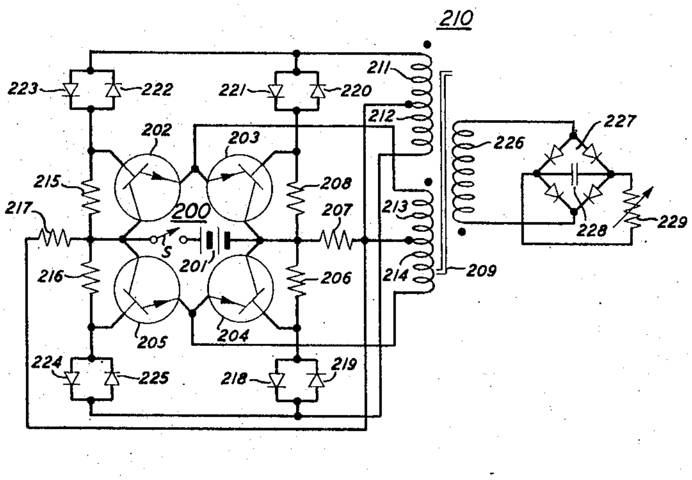
Figure 3:
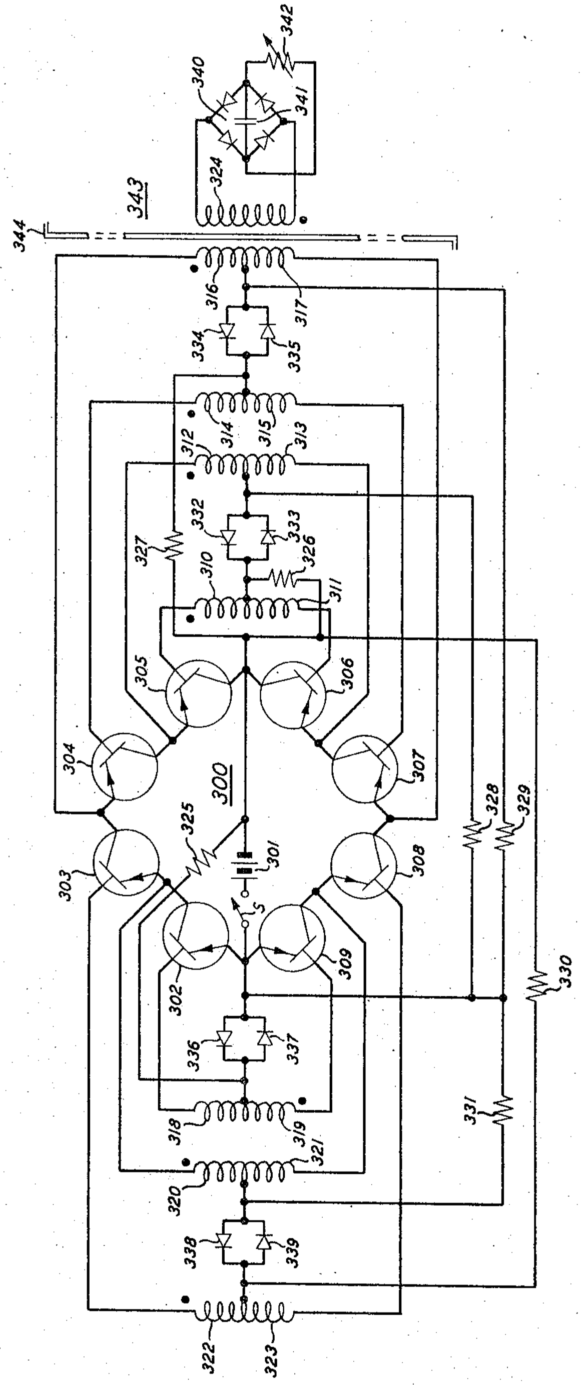

Other objects and features of the present invention will become apparent upon consideration of the following detailed description when taken in connection with the accompanying drawings, in which:

FIG. 1 is a schematic representation of an electrical circuit comprising one embodiment of the invention; and FIGS. 2 and 3 are schematic representations of electrical circuits comprising different embodiments of the invention.

Referring now to FIG. 1 of the drawing, there is provided a bridge circuit 100 having p-n-p type transistors 102 and 104, in one pair of opposite arms of the bridge and p-n-p transistors 103 and 105, in the remaining pair of opposite arms, all the transistors being similar. An input direct-current voltage source 101 is connected to the input vertices of the bridge as shown. The emitters of transistors 102 and 105 are connected to one input vertex and the collectors of transistors 103 and 104 to the other input vertex. The collector of transistor 102 and emitter of transistor 103 are tied to one output vertex and the collector of transistor 105 and emitter of transistor 104 to the other output vertex. There is provide a transformer 110 having windings or winding portions 111, 112, 113, 114, 115, 116, and 121 wound on a core 109 of saturable magnetic material preferably having a high permeability and a substantially rectangular hysteresis loop. The winding portions 111 and 112, 113 and 114, 115 and 116, have one terminal of each connected together respectively. The other two terminals of winding portions 115 and 116 are connected to the bridge output vertices. The other terminal of winding portion 111 is connected to the base of transistor 105, while the other terminal of winding portion 112 is connected to the base of transistor 102. Two oppositely polarized asymmetrically conducting devices 119 and 120 connect the common terminal of winding portions 111 and 112 to the input vertex connecting the emitters of transistors 102 and 105. The other terminal of winding portion 113 is connected to the base of transistor 103, while the other terminal of winding portion 114 is connected to the base of transistor 104. The resistor 108 connects the common terminal of winding portions 111 and 112 to the input vertex connecting the collectors of transistors 103 and 104. Resistor 107 connects the common terminal of winding portions 113 and 114 to the input vertex connecting the collectors of transistors 103 and 104. Two oppositely polarized asymmetrically conducting devices 117 and 118 connect the common terminal of winding portions 113 and 114 to the common terminal of winding portions 115 and 116. Resistor 106 connects the common terminal of winding portions 115 and 116 to the input vertex connecting the emitters of transistors 102 and 105.

If desired, the alternating current induced in secondary transformer winding 121 may be rectified by a bridge rectifier 122 having a filtering capacitor 123 connected across the rectifier output terminals. The rectified current is supplied from the output terminals of rectifier 122 to a variable load 124.

Although the configuration heretofore described uses p-n-p transistors, it should be understood that n-p-n transistors could be used equally as effectively.

To start a bridge converter it appears to be necessary only to apply a base-to-emitter bias to the transistors in one set of opposite arms. It has been found, however, that this method is unreliable at other than room temperatures. For maximum starting reliability, such as in the configuration of FIG. 1, it is necessary to apply a thermally stabilized base-to-emitter bias to each of the transistors. Although all the transistors are of the same conductivity type and have the same rating, the current gain of any one of the transistors will not be equal to the gain of any of the other transistors. The transistor with the higher current gain will be faster acting, that is, the current in the emitter-collector path will increase at a higher rate, which is all that is necessary to start the converter's push-pull mode of operation. Only very slight variations in transistor characteristics are necessary since each transistor is biased "on." Once the converter is in its push-pull mode of oscillation the starting means may be removed. Two such starting networks are shown in FIG. 1. The starting network for transistors 102 and 105 and the starting network for transistors 103 and 104 are slightly different since it has been found that if symmetrical starting networks are used, i.e., the starting network for transistors 103 and 104 is identical to the starting network for transistors 102 and 105, the inverse collector-to-base voltage across the transistor electrodes is twice the input voltage. The maximum allowable input voltage will, therefore, have to be less than half the inverse collector-to-base voltage rating, thereby destroying the primary advantage of the bridge configuration, as discussed earlier.

The starting network for transistors 102 and 105 comprises the resistor 108 and the asymmetrically conducting device 120. At the instant of closing the switch S applying the input direct-current voltage 101 there is no bias voltage induced in windings 111 and 112. The asymmetrically conducting device 120 is thus biased in a forward direction, and a small voltage drop is established across the asymmetrically conducting device due to its inherent internal resistance. The sum of the voltage drops across the asymmetrically conducting device 120 and resistor 108 is equal to the input direct-current voltage 101. The relatively small voltage drop across the asymmetrically conducting device 120 biases the emitter-to-base junction of transistors 102 and 105 and renders them conducting. Thus, the self-starting feature is achieved.

The initially forward biased asymmetrically conducting device 120 minimizes the temperature dependence of the loop gain thereby insuring self-starting over wide temperature ranges. If the asymmetrically conducting device 120 if constructed of the same semiconductor material as the transistors to be thermally compensated, then the required temperature dependent voltage for thermal stabilization at the lower temperatures is provided by the asymmetrically conducting device 120.

As described hereinafter, once the circuit is oscillating, the voltage induced in winding 112 forward biases the initially reverse biased asymmetrically conducting device 119 to remove the starting bias. The device 119 also decreases the turn-off or decay time of the previously conducting transistor, 102 or 105. As in the case of the asymmetrically conducting device 120, if the asymmetrically conducting device 119 and the transistors are made of the same semiconductor material, then the required temperature dependent current for thermal stabilization at the higher temperatures is provided by the asymmetrically conducting device 119. The use of the double asymmetrically conducting device network comprising asymmetrically conducting devices 119 and 120 polarized in opposite directions, increases both the lower and higher temperature range.

Self-starting may also be obtained by substituting a single resistor for the asymmetrically conducting devices 119 and 120, thereby achieving the necessary emitter-to-base bias. However, the use of resistors may render the circuit thermally unstable and, in addition, result in larger power losses. If the resistor to be substituted has a relatively large value compared to resistor 108 the circuit becomes more thermally unstable and may require larger feedback windings to insure transistor saturation. If the resistor to be substituted has a relatively small value compared to resistor 108 the circuit becomes more difficult to start. It has been found that when an asymmetrically conducting device, such as device 119, is connected across the starting resistor, the resistive power losses may be eliminated.

The starting network for transistors 103 and 104 comprises resistors 106 and 107 and the asymmetrically conducting devices 117 and 118. As in the case of the asymmetrically conducting device 120, the asymmetrically conducting device 118 has a small voltage drop across it due to its internal resistance. This voltage drop, in turn, biases the emitter-to-base junctions of transistors 103 and 104. The oppositely polarized asymmetrically conducting device 117 is provided, as was the asymmetrically conducting device 119, to remove the starting bias and to decrease transistor turn-off or decay time. As discussed in connection with the starting network for transistors 102 and 105, self-starting may also be achieved by substituting a resistor for the asymmetrically conducting device 118. For the reasons already noted, however, this method is not preferred.

Optimum operation appears to be achieved when the starting network for transistors 103 and 104 comprises two resistors, the sum of whose values is equal to the value of the resistor in the starting network of transistors 102 and 105. For example, in the circuit of FIG. 1, the value of each of the starting resistors 106 and 107 is $R/2$ while the value of the starting resistor 108 is R. The combination of the center-tapped portions of the primary and feedback windings with the "split" starting resistors (106 and 107) insures equal voltage division across the electrodes of the transistors, thereby providing maximum input voltage capability of the bridge converter configuration.

In the circuit of FIG. 1, once the circuit is started transistors 102 and 104, for example, will be substantially fully conductive during intermittent periods and transistors 103 and 105 will be substantially fully conductive during intervals separating the intermittent periods. When transistors 102 and 104 are conductive, current flows from the direct-current supply source 101 through the collector-emitter path of transistor 102, through winding portions 115 and 116 and through the emitter-collector path of transistor 104 and back to the input direct-current supply source 101. When transistors 102 and 104 are substantially nonconductive and transistors 103 and 105 are substantially conductive, current flows from the direct-current supply source 101 through the collector-emitter path of transistor 105, through winding portions 115 and 116 and through the collector-emitter path of transistor 103 back to the input direct-current supply source 101. It should be noted that the current in winding portions 115 and 116 reverses in direction. As shown by the dot convention of the windings, the voltage induced in each of the windings will change in direction with the current change in winding portions 115 and 116. The voltages induced in the combination of winding portions 111, 112 and the combination of winding portions 113, 114, 115 and 116 bias the base-emitter electrodes of each of the transistors 102, 103, 104 and 105. The polarity and the varying magnitude of the base-emitter bias determines whether any particular transistor is being driven toward cut-off or saturation. For example, if the base-to-emitter bias of transistors 102 and 104 is such that there is a small current flow through the collector-emitter path of the transistors, current will flow into the dot of winding portions 115 and 116. This current flow will, in turn, due to the effects of the magnetic flux established, induce larger emitter-to-base bias voltages—thus rendering transistors 102 and 104 more conductive and drive transistors 103 and 105 further into cut-off. This cyclic process continues until the current flow into winding portions 115 and 116 reaches such a value that the saturable transformer core 109 is saturated and no further change of flux can occur. At this point, since no further change of flux can occur, the voltage induced in the base-emitter bias windings falls to zero, hence the collector-emitter current flow is reduced to zero which, in turn, causes the flux in the saturable transformer to collapse. The collapsing flux induces a voltage in winding portions 111, 112, and winding portions 113, 114, 115 and 116 in the opposite direction to the previous base-to-emitter bias voltage. This new bias voltage causes transistors 103 and 105 to conduct and cuts off transistors 102 and 104. The current flow in the winding portions 115 and 116 is now in the opposite direction to the direction of flow when transistors 102 and 104 were conducting. This current, as before, induces larger base-to-emitter bias voltages rendering transistors 103 and 105 more conductive and driving transistors 102 and 104 further into cut-off. This process again continues till the saturable transformer core 109 becomes saturated and the cycle repeats itself. The oscillatory cycle will continue until the input direct-current supply 101 is removed.

The circuit of FIG. 2 uses an individual starting, thermal stabilization, and decreased transistor turn-off or decay time network for each of the transistors in the bridge configuration 200. As shown in the drawing, the starting, thermal stabilization and decreased transistor turn-off or decay time network for transistor 202 comprises resistors 207 and 215 and asymmetrically conducting devices 222 and 223, while the similar network for transistor 203 comprises resistors 217 and 208 and asymmetrically conducting devices 220 and 221. The starting, thermal stabilization and decreased transistor turn-off or decay time network for transistor 205 comprises resistors 216 and 207 and asymmetrically conducting devices 224 and 225, while the similar network for transistor 204 comprises resistors 217 and 206 and asymmetrically conducting devices 218 and 219. Each of these devices functions in the same manner as the starting, thermal stabilization, and decreased transistor turn-off or decay time network of transistors 103 and 104 in FIG. 1. Optimum operation appears to be achieved when the resistors 206, 207, 208, 215, 216 and 217 are all of the same value. Once the circuit of FIG. 2 is started, i.e. oscillating, its push-pull mode of operation is the same as that described in connection with FIG. 1. The characteristics and description of the saturable transformer 210 with a saturable core 209 and secondary winding 226 which has a full-wave bridge rectifier 227 with a filter 228 attached to a load 229 of FIG. 2 are substantially the same as the equivalent components 110, 109, 121, 122, 123 and 124, respectively, of FIG. 1.

Although the circuit of FIG. 2 requires a larger number of resistors and asymmetrically conducting devices than the circuit of FIG. 1, it should be noted that a decreased number of saturable transformer windings are required, wherein lies its principal advantage. The circuit of FIG. 1 requires winding portions 111, 112, 113, 114, 115 and 116. The circuit of FIG. 2 requires winding portions 211, 212, 213 and 214 thereby saving two winding portions. The functions of the winding portions in FIG. 2 are, as noted above, the same as the winding functions of FIG. 1.

The configuration of FIG. 2 uses two n-p-n transistors 202 and 205 and two p-n-p transistors 203 and 204, respectively, connected in an application of the principle of complementary symmetry. It should be understood that the p-n-p and n-p-n transistors could be interchanged simply by reversing the polarity of the direct-current voltage supply 201. The circuits of FIGS. 1 and 2 function equally as effectively for substantially all loads. The choice between them is usually dictated by the particular application and the economics involved therein.

As discussed in connection with FIG. 1, the asymmetrically conducting devices may be replaced by suitable resistors for starting purposes. However, as noted heretofore, the thermal stabilization, power saving and decreased transistor turn-off or decay time advantages of the asymmetrically conducting device network are not obtained.

Four transistor bridge configurations may be extended to high power output levels by the method shown in FIG. 3 which provides for equalized inverse collector-emitter voltages without appreciably sacrificing efficiency. As discussed heretofore, the maximum input direct-current voltage in the bridge configuration of FIG. 3 is twice that of the bridge configurations of FIGS. 1 and 2, thus implying greater power output. Each of the four additional transistors requires, however, additional biasing and starting means.

Referring to FIG. 3 of the drawing, there is provided a bridge circuit 300 comprising eight p-n-p transistors, two in each arm of said bridge. An input direct-current voltage source 301 is connected to the input vertices of the bridge as shown. The emitters of transistors 302 and 309 are connected to one input vertex and the collectors of transistors 305 and 306 to the other input vertex. The collector of transistor 303 and emitter of transistor 304 are connected to one output vertex while the collector of transistor 308 and emitter of transistor 307 are connected to the other output vertex. The collector and emitter electrodes of transistors 302 and 303, 304 and 305, 307 and 306, 309 and 308, respectively, are connected together. There is provided a saturable transformer 343 having winding or winding portions 310, 311, 312, 313, 314, 315, 316, 317, 318, 319, 320, 321, 322, 323 and 324 wound on a common core 344 of saturable magnetic material preferably having a high permeability and a substantially rectangular hysteresis loop. The transformer windings in the drawing are not shown on the common core for simplicity and clarity of the drawing. Common core connection is, however, not necessary. The number of saturable transformer windings is equal to the number of transistors in the bridge configuration. The winding portions 310 and 311, 312 and 313, 314 and 315, 316 and 317, 318 and 319, 320 and 321, 322 and 323 have one terminal connected together respectively. The other two terminals of winding portions 316 and 317 are connected to the bridge output vertices. The other terminal of winding portion 310 is connected to the base of transistor 305, while the other terminal of winding portion 311 is connected to the base of transistor 306. The other terminal of winding portion 312 is connected to the emitter of transistor 305 while the other terminal of winding portion 313 is connected to the emitter terminal of transistor 306. The windings comprising winding portions 310 and 311, 312 and 313 provide the base-to-emitter bias of transistors 305 and 306. The other terminal of winding portion 314 is connected to the base of transistor 304 while the remaining terminal of winding portion 315 is connected to the base of transistor 307. The windings comprising winding portions 314 and 315, 316 and 317 provide base-to-emitter bias for transistors 304 and 307. The other terminal of winding portion 318 is connected to the base of transistor 302 while the remaining terminal of winding portion 319 is connected to the base of transistor 309. The winding comprising winding portions 318 and 319 provides base-to-emitter bias for transistors 302 and 309. The other terminal of winding portion 320 is connected to the emitter of transistor 303 while the remaining terminal of winding portion 321 is connected to the emitter of transistor 308. The other terminal of winding portion 322 is connected to the base of transistor 303 while the remaining terminal of winding portion 323 is connected to the base of transistor 308. The windings comprising winding portions 320 and 321, 322 and 323 provide the base-to-emitter bias for transistors 303 and 308. Two oppositely polarized asymmetrically conducting devices 332 and 333 connect the common terminal of winding portions 310 and 311 to the common terminal of winding portions 312 and 313. Resistor 326 connects the common terminal of winding portions 310 and 311 to the input vertex connecting the collectors of transistors 305 and 306. Resistor 328 connects the common terminal of winding portions 312 and 313 to the input vertex connecting the emitters of transistors 302 and 309. The asymmetrically conducting devices 332 and 333 and resistors 326 and 328 comprise the starting, thermal stabilization and decreased transistor turn-off or decay time network for transistors 305 and 306. Two oppositely polarized asymmetrically conducting devices 334 and 335 connect the common terminal of winding portions 314 and 315 to the common terminal of winding portions 316 and 317. Resistor 327 connects the common terminal of winding portions 314 and 315 to the input vertex connecting the collectors of transistors 305 and 306. Resistor 329 connects the common terminal of winding portions 316 and 317 to the input vertex connecting the emitters of transistors 302 and 309. The asymmetrically conducting devices 334 and 335 and resistors 327 and 329 comprise the starting, thermal stabilization and decreased transistor turn-off or decay time network for transistors 304 and 307. Two oppositely polarized asymmetrically conducting devices 336 and 337 connect the common terminal of winding portions 318 and 319 to the input vertex connecting the emitters of transistors 302 and 309. Resistor 325 connects the common terminal of winding portions 318 and 319 to the input vertex connecting to the collectors of transistors 305 and 306. The asymmetrically conducting devices 336 and 337 and resistor 325 comprise the starting, thermal stabilization and decreased transistor turn-off or decay time network for transistors 302 and 309. Two oppositely polarized asymmetrically conducting devices 338 and 339 connect the common terminal of winding portions 320 and 321 to the common terminal of winding portions 322 and 323. Resistor 331 and connects the input vertex connecting the emitters of transistors 302 and 309 to the common terminal of winding portions 320 and 321. Resistor 330 connects the input vertex connecting the collectors of transistors 305 and 306 to the common terminal of winding portions 322 and 323. The asymmetrically conducting devices 338 and 339 and resistors 330 and 331 comprise the starting, thermal stabilization and decreased transistor turn-off or decay time network for transistors 303 and 308.

Optimum operation appears to be achieved by proportioning the resistors as follows: assuming the value of resistor 325 is R, then the value of resistors 328 and 330 is $3R/4$, the value of resistors 327 and 329 is $R/2$, while the value of resistors 326 and 331 is $R/4$. The value of R would depend upon the particular components in any given application. It should be noted that the sum of the resistors in each starting network is equal to R.

If desired, the alternating current induced in transformer winding 324 may be rectified by a bridge rectifier 340 having a filtering capacitor 341 connected across the bridge output terminals. The rectified current is supplied from the output terminals of rectifier 340 to a variable load 342.

Although the configuration heretofore described uses p-n-p transistors, it should be understood that n-p-n transistors could be used equally as effectively. The bridge configuration could also be extended without limit if appropriate windings and starting, thermal stabilization, and decreases transistor turn-off and decay time networks were added, thereby provding an unlimited voltage and power range. As was discussed in connection with FIGS. 1 and 2, it is possible to reduce the number of required saturable transformer windings by increasing the number of starting, thermal stabilization and decreased transistor turn-off or decay time networks. The resulting circuit would function equally as effectively for substantially all loads. The choice would be again dictated by the particular application and the economics involved therein.

If the configuration of FIG. 3 were extended to $n$ transistors to increase the voltage range to $n/2$ times its present value, $n$ saturable transformer windings would be required. Each of $n/2$ windings would be connected from the base of a transistor in one arm of the bridge to the base of the corresponding transistor in the adjacent arm of the bridge. One winding would be required as a secondary winding. Each of the remaining $$\frac{n}{2}-1$$

windings would be connected from the collector-emitter connection of adjoining transistors in one arm of the bridge to the corresponding collector-emitter connection in the adjacent arm of of the bridge. In addition, $n$ asymmetrically conducting devices and $n-1$ resistors would be required.

Optimum operation appears to be achieved by following the symmetrical resistor proportioning scheme described in connection with FIG. 3. In each network the value of the larger resistor would be $$R\left(1-\frac{2}{n}\right)$$

while the value of the smaller resistor would be $2R/n$, where $n$ would be taken in steps of four, i.e., 4, 8, 12, 16, to the total number of transistors in the extended bridge. As in FIG. 3, it should be noted that the sum of the resistors in each starting network is equal to R.

The starting and push-pull mode of operation of the configuration shown in FIG. 3 is essentially the same as discussed in connection with FIGS. 1 and 2. The voltage drop across the internal resistance of asymmetrically conducting devices 332, 334, 336 and 338 in conjunction with the split starting resistors 326 and 328, 327 and 329, 330 and 331, and resistor 325 provides the starting bias for each of the transistors. The starting resistors are split into various proportioned values as required by the circuit configuration. The asymmetrically conducting devices 333, 335, 337 and 339 are added to remove the starting bias once the circuit is oscillating. Once started, the push-pull mode of oscillation of the circuit is the same as described for the four-transistor bridge of FIG. 1.

As discussed in connection with FIGS. 1 and 2, the asymmetrically conducting devices may be replaced by suitable resistors for starting purposes.

Since changes may be made in the above-described arrangement, and different embodiments may be devised by those skilled in the art without departing from the spirit and scope of the invention, it is to be understood that all matter contained in the foregoing description and accompanying drawings is illustrative of the application of the principles of the invention, and is not to be construed in a limiting sense.

What is claimed is:

1. In a current supply apparatus, a saturable inductance device comprising a plurality of windings, a bridge circuit having four arms forming a pair of input terminals and a pair of output terminals, means for connecting a direct-current voltage source to said input terminals, means for connecting one of said windings across said output terminals, $n$ transistors each having a base, a collector and an emitter electrode, an equal number of said transistors in each arm of said bridge, means comprising another of said windings for connecting the base electrode of a transistor in one arm of said bridge to the base electrode of a corresponding transistor in an adjacent arm of said bridge, means for connecting a portion of said other winding to a portion of said winding connected across said output terminals, means for connecting the emitter-collector electrodes of said transistors in such manner that a first current path including the winding connected across said output terminals and said direct-current voltage source may be established through the emitter-collector electrodes of the transistors in a pair of opposite arms of said bridge, and a second current path opposite in direction to said first current path and including said winding and said voltage source may be established through the emitter-collector electrodes of the transistors in the remaining pair of arms of said bridge.

2. In a power supply system, a saturable inductance device comprising a plurality of windings, a bridge circuit having four arms forming a pair of input vertices and a pair of output vertices, an input voltage source connected to said input vertices, $n$ transistors each having base, collector and emitter electrodes, an equal number of said transistors in each arm of said bridge, means for connecting the collector electrodes of two of said $n$ transistors immediately adjacent one input vertex to said input vertex, means for connecting said emitter electrodes of two of said $n$ transistors immediately adjacent the other input vertex to said other input vertex, means for serially connecting the remaining adjacent collector and emitter electrodes of said transistors, means for individually connecting the base electrodes of the transistors in one arm of said bridge to the base electrodes of corresponding transistors in an adjacent arm of said bridge, each of said means comprising an individual one of said windings, means for individually connecting the emitter electrodes of the transistors in one arm of said bridge to the emitter electrodes of corresponding transistors in an adjacent arm of said bridge, each of said means comprising an individual one of said remaining windings, means for connecting a portion of the base connecting winding of the two transistors immediately adjacent the input vertex to which the emitter electrodes of said transistors are connected to said input vertex, means for individually connecting a portion of each of said remaining base connecting windings to a portion of its corresponding emitter connecting winding.

3. In a power supply system, a saturable inductance device comprising a plurality of windings, a bridge circuit having four arms forming a pair of input vertices and a pair of output vertices, an input voltage source connected to said input vertices, $n$ transistors each having base, collector and emitter electrodes, an equal number of said transistors in each arm of said bridge, means for connecting the collector electrodes of two of said $n$ transistors immediately adjacent one input vertex to said input vertex, means for connecting said emitter electrodes of two of said $n$ transistors immediately adjacent the other input vertex to said other input vertex, means for serially connecting the remaining adjacent collector and emitter electrodes of said transistors, means for individually connecting the base electrodes of the transistors in one arm of said bridge to the base electrodes of corresponding transistors in an adjacent arm of said bridge, each of said means comprising an individual one of said windings, means for individually connecting the emitter electrodes of the transistors in one arm of said bridge to the emitter electrodes of corresponding transistors in an adjacent arm of said bridge, each of said means comprising an individual one of said remaining windings, means for connecting equal portions of the base connecting winding of the two transistors immediately adjacent the input vertex to which the emitter electrodes of said transistors are connected to said input vertex, means for individually connecting equal portions of each of said remaining base connecting windings to equal portions of its corresponding emitter connecting winding.

4. In a power supply system, a saturable inductance device comprising a plurality of windings, a bridge circuit having four arms forming a pair of input vertices and a pair of output vertices, an input voltages source connected to said input vertices, $n$ transistors each having base, collector and emitter electrodes, an equal number of said transistors in each arm of said bridge, means for connecting the collector electrodes of two of said $n$ transistors immediately adjacent one input vertex to said input vertex, means for connecting said emitter electrodes of two of said $n$ transistors immediately adjacent the other input vertex to said other input vertex, means for serially connecting the remaining adjacent collector and emitter electrodes of said transistors, means for individually connecting the base electrodes of the trnasistors in one arm of said bridge to the base electrodes of corresponding transistors in an adjacent arm of said bridge, each of said means comprising an individual one of said windings, means for individually connecting the emitter electrodes of the transistors in one arm of said bridge to the emitter electrodes of corresponding transistors in an adjacent arm of said bridge, each of said means comprising an individual one of said remaining windings, transistor starting and stabilizing means comprising $n/2$ asymmetrically conducting devices and $n-1$ resistors, means for connecting a portion of the base connecting winding of the two transistors immediately adjacent the input vertex to which the emitter electrodes of said transistors are connected to said input vertex, said means comprising one of said asymmetrically conducting devices, means for individually connecting a portion of each of said remaining base connecting windings to a portion of its corresponding emitter connecting winding, each of said means comprising an individual one of the remainder of said asymmetrically conducting devices, means for individually connecting each of said base connecting windings to the input vertex to which said collector electrodes are connected, each of said connecting means comprising an individual one of said resistors, means for individually connecting each of said emitter connecting windings to the input vertex to which said emitter electrodes are connected, each of said connecting means comprising an individual one of said resistors whereby the transistors in a pair of opposite arms of said bridge are rendered simultaneously conductive during intermittent periods and the transistors in the remaining pair of opposite arms are rendered conductive during intervals separating said periods.

5. A power supply system, in accordance with claim 4 wherein an individual oppositely polarized asymmetrically conducting device is connected across each of said transistor starting asymmetrically conducting devices, whereby said oppositely polarized asymmetrically conducting devices provide decreased transistor turn-off or decay time and increased thermal stabilization.

6. In a power supply system, a saturable inductance device comprising a plurality of windings, a bridge circuit having four arms forming a pair of input vertices and a pair of output vertices, an input voltage source connected to said input vertices, $n$ transistors each having base, collector and emitter electrodes, an equal number of said transistors in each arm of said bridge, means for connecting the collector electrodes of two of said $n$ transistors immediately adjacent one input vertex to said input vertex, means for connecting said emitter electrodes of two of said $n$ transistors immediately adjacent the other input vertex to said other input vertex, means for serially connecting the remaining adjacent collector and emitter electrodes of said transistors, means for individually connecting the base electrodes of the transistors in one arm of said bridge to the base electrodes of corresponding transistors in an adjacent arm of said bridge, each of said means comprising an individual one of said windings, means for individually connecting the emitter electrodes of the transistors in one arm of said bridge to the emitter electrodes of corresponding transistors in an adjacent arm of said bridge, each of said means comprising an individual one of said remaining windings, transistor starting means comprising $$\frac{3n-2}{2}$$

resistors, means for connecting a portion of the said base connecting winding of the two transistors immediately adjacent the input vertex to which the emitter electrodes of said transistors are connected to said input vertex, said means comprising one of said resistors, means for individually connecting a portion of each of said remaining base connecting windings to a portion of its corresponding emitter connecting winding, each of said means comprising an individual one of said resistors, means for individually connecting each of said base connecting windings to the input vertex to which said collector electrodes are connected, each of said connecting means comprising an individual one of said resistors, means for individually connecting each of said emitter connecting windings to the input vertex to which said emitter electrodes are connected, each of said connecting means comprising an individual one of said resistors whereby the transistors in a pair of opposite arms of said bridge are rendered simultaneously conductive during intermittent periods and the transistors in the remaining pair of opposite arms are rendered conductive during intervals separating said periods.

7. A power supply system in accordance with claim 6 wherein an asymmetrically conducting device is connected across the resistor included in said means connecting a portion of the said base connecting winding of the two transistors immediately adjacent the input vertex to which the emitter electrodes of said transistors are connected to said input vertex and an individual asymmetrically conducting device is connected across each of the resistors included in said means individually connecting a portion of each of said remaining base connecting windings to a portion of its corresponding emitter connecting winding.

8. In a current supply apparatus, first, second, third and fourth transistors, each of said transistors having a base, collector and emitter electrodes, a saturable inductance device comprising first, second, third and fourth windings, a load, means for connecting said load to said fourth saturable inductance winding, a bridge circuit having four arms forming a pair of input and output vertices, one of said transistors in each arm of said bridge, means for connecting the emitter electrodes of said first and fourth transistors to one of said input vertices, means for connecting the collector electrodes of said second and third transistors to the other of said input vertices, means for connecting the collector-emitter path of said first and third transistors to one of said output vertices, means for connecting the collector-emitter path of said second and fourth transistors to the other of said output vertices, means for connecting a direct-current voltage to said input vertices, means for connecting said first saturable inductance winding across said output vertices, means for connecting said second saturable inductance winding across the base electrodes of said first and fourth transistors, means for connecting said third saturable inductance winding across the base electrodes of said second and third transistors, means for connecting a portion of said first winding to a portion of said third winding, means for connecting a portion of said second winding to the input vertex to which the emitter electrodes of said first and fourth transistors are connected, whereby said first and second transistors and said third and fourth transistors become alternately conductive to cause current from said direct-current source to flow alternately through the collector-emitter paths of said first pair of transistors and said first inductive winding, and through the collector-emitter paths of said second pair of transistors and said first inductive winding, the current flowing through said first inductive winding in opposite directons.

9. In a current supply apparatus, first, second third and fourth transistors, each of said transistors having base, collector and emitter electrodes, a saturable inductance device comprising first, second, third and fourth windings, a bridge circuit having four arms forming a pair of input and a pair of output vertices, one of said transistors in each arm of said brdge circuit, means for connecting the emitter electrodes of said first and fourth transistors to one of said input vertices, means for connecting the collector electrodes of said second and third transistors to the other of said input vertices, means for connecting the collector-electrode of said first transistor and the emitter electrode of said third transistor to one of said output vertices, means for connecting the emitter electrode of said second transistor and the collector electrode of said fourth transistor to the other of said output vertices, means for connecting a direct-current voltage to said input vertices, means for connecting said first inductance winding to said output vertices, means for connecting said second inductance winding across the base electrodes of said first and fourth transistors, means for connecting said third inductance winding across the base electrodes of said second and third transistors, transistor starting and stabilizing means comprising first and second asymmetrically conducting devices, first, second and third resistors, means for connecting said first asymmetrically conducting device from a portion of said second inductance winding to the input vertex to which the emitter electrodes of said first and fourth transistors are connected, means for connecting said second asymmetrically conductive device from a portion of said first inductance winding to a portion of said third inductance winding, means for connecting said first resistor from said portion of said second inductance winding to said input vertex to which the collector terminals of said second and third transistors are connected, means for connecting said second resistor from a portion of said third inductance winding to the input vertex to which the collector terminals of said second and third transistors are connected, means for connecting said third resistor from said portion of said first inductance winding to the input vertex to which the emitter terminals of said first and fourth transistors are connected, a load, and means for connecting said load to said fourth inductance winding.

10. A current supply apparatus in accordance with claim 9 wherein an individual oppositely polarized asymmetrically conducting device is connected across each of said first and second asymmetrically conducting devices, whereby decreased transistor turn-off or decay time and increased thermal stabilization are provided.

11. A current supply apparatus in accordance with claim 9 wherein the sum of the second and third resistors is equal to the value of the first resistor.

12. In a current supply apparatus, first, second, third and fourth transistors, each of said transistors having base, collector and emitter electrodes, a saturable inductance device comprising first, second, third and fourth windings, a bridge circuit having four arms forming a pair of input and a pair of output vertices, one of said transistors in each arm of said bridge circuit, means for connecting the emitter electrodes of said first and fourth transistors to one of said input vertices, means for connecting the collector electrodes of said second and third transistors to the other of said input vertices, means for connecting the collector electrode of said first transistor and the emitter electrode of said third transistors to one of said output vertices, means for connecting the emitter electrode of said second transistor and the collector electrode of said fourth transistor to the other of said output vertices, means for connecting a direct-current voltage to said input vertices, means for connecting said first inductance winding to said output vertices, means for connecting said second inductance winding to the base electrode of said first and fourth transistors, means for connecting said third inductance winding to the base electrodes of said second and third transistors, transistor starting means comprising first, second, third, fourth and fifth resistors, means for connecting said first resistor from said portion of said second inductance winding to the input vertex to which the collector terminals of said second and third transistors are connected, means for connecting said second resistor from a portion of said third inductance winding to the input vertex to which the collector terminals of said second and third transistors are connected, means for connecting said third resistor from a portion of said first inductance winding to the input vertex to which the emitter terminals of said first and fourth transistors are connected, means for connecting said fourth resistor from said portion of said second inductance winding to the input vertex to which the emitter electrodes of said first and fourth transistors are connected, means for connecting said fifth resistor from a portion of said first inductance winding to a portion of said third inductance winding, a load, and means for connecting said load to said fourth inductance winding.

13. A current supply apparatus in accordance with claim 12 wherein an individual asymmetrically conducting device is connected across each of said fourth and fifth resistors.

14. In a power supply system, first and second transistors of opposite conductivity type, third and fourth transistors of opposite conductivity type, each of said transistors having base, collector and emitter electrodes, a saturable inductance device comprising first, second and third windings, a load, means for connecting said load to said third inductance winding, a bridge circuit having four arms forming a pair of input and a pair of output vertices, one of said transistors in each arm of said bridge, means for connecting the collector electrodes of said first and fourth transistors to one of said input vertices, means for connecting the collector electrodes of said second and third transistors to the other of said input vertices, means for connecting the emitter electrodes of said first and third transistors to one of said output vertices, means for connecting the emitter electrodes of said second and fourth transistors to the other of said output vertices, means for connecting said first inductance winding across said output vertices, means for connecting a direct-current voltage to said input vertices, means for connecting said second inductance winding across the base electrodes of said second and third transistors, means for connecting the base electrode of said third transistor to the base electrode of said first transistor, means for connecting the base electrode of said second transistor to the base electrode of said fourth transistor, means for connecting a portion of said first inductance winding to a portion of said second inductance winding, whereby said first and second transistors and said third and fourth become alternately conductive to cause current from said direct-current source to flow alternately through the collector-emitter paths of said first pair of transistors and said first inductance winding, and through the collector-emitter paths of said second pair of transistors and said first inductance winding, the current flowing through said first inductance winding in opposite directions.

15. In a power supply system, first and second transistors of opposite conductivity type, third and fourth transistors of opposite conductivity type, each of said transistors having base, collector and emitter electrodes, a saturable inductance device comprising first, second and third windings, a bridge circuit having four arms forming a pair of input and a pair of output vertices, one of said transistors in each arm of said bridge, means for connecting the collector electrodes of said first and fourth transistors to one of said input vertices, means for connecting the collector electrodes of said second and third transistors to the other of said input vertices, means for connecting the emitter electrodes of said first and third transistors to one of said output vertices, means for connecting the emitter electrodes of said second and fourth transistors to the other of said output vertices, means for connecting said first inductance winding across said output vertices, means for connecting a direct-current voltage to said input vertices, means for connecting said second inductance winding across the base electrodes of said second and third transistors, starting and stabilizing means comprising first, second, third and fourth asymmetrically conducting devices and first, second, third, fourth, fifth and sixth resistors, means for serially connecting the base electrode of said third transistor, said first asymmetrically conducting device, said second inductance winding, said second asymmetrically conducting device, and the base electrode of said second transistor, means for serially connecting the base electrode of said first transistor, said third asymmetrically conducting device, said second inductance winding, said fourth asymmetrically conducting device and the base electrode of said fourth transistor, means for connecting a portion of said first inductance winding to a portion of said second inductance winding, means for connecting said first resistor to said portion of said first inductance winding and to the input vertex to which the collector electrodes of said second and third transistors are connected, means for connecting said second resistor to said portion of said first inductance winding and to the input vertex to which the collector electrodes of said first and fourth transistors are connected, means for connecting said third resistor to the base electrode of said first transistor and to the input vertex to which the collector electrodes of said first and fourth transistors are connected, means for connecting said fourth resistor to the base electrode of said second transistor and to the input vertex to which the collector electrodes of said second and third transistors are connected, means for connecting said fifth resistor to the base electrode of said third transistor and to the input vertex to which the collector electrodes of said second and third transistors are connected, means for connecting said sixth resistor to the base electrode of said fourth transistor and to the input vertex to which the collector electrodes of said first and fourth transistors are connected, a load, and means for connecting said load to said third inductance winding.

16. A power supply system in accordance with claim 15 wherein an individual oppositely polarized asymmetrically conducting device is connected across each of said first, second, third and fourth asymmetrically conducting devices, whereby decreased transistor turn-off or decay time and increased thermal stabilization are provided.

17. A power supply system in accordance with claim 15 wherein the sum of the first and third resistors, the sum of the first and sixth resistors, the sum of the second and fourth resistors and the sum of the second and fifth resistors are equal.

18. In a power supply system, first and second transistors of opposite conductivity type, comprising first, third and fourth transistors of opposite conductivity type, each of said transistors having base, collector and emitter electrodes, a saturable inductance device comprising first, second and third windings, a bridge circuit having four arms forming a pair of input and a pair of output vertices, one of said transistors in each arm of said bridge, means for connecting the collector electrodes of said first and fourth transistors to one of said input vertices, means for connecting the collector electrodes of said second and third transistors to the other of said input vertices, means for connecting the emitter electrodes of said first and third transistors to one of said output vertices, means for connecting the emitter electrodes of said second and fourth transistors to the other of said output vertices, means for connecting said first inductance winding across said output vertices, means for connecting a direct-current voltage to said input vertices, means for connecting said second inductance winding across the base electrodes of said second and third transistors, starting means comprising first, second, third, fourth, fifth, sixth, seventh, eighth, ninth and tenth resistors, means for connecting a portion of said first inductance winding to a portion of said second inductance winding, means for connecting said first resistor to said portion of said first inductance winding and to the input vertex to which the collector electrodes of said second and third transistors are connected, means for connecting said second resistor to said portion of said first inductance winding and to the input vertex to which the collector electrodes of said first and fourth transistors are connected, means for connecting said third resistor to the base electrode of said first transistor and to the input vertex to which the collector electrodes of said first and fourth transistors are connected, means for connecting said fourth resistor to the base electrode of said second transistor and to the input vertex to which the collector electrodes of said second and third transistors are connected, means for connecting said fifth resistor to the base electrode of said third transistor and to the input vertex to which the collector electrodes of said second and third transistors are connected, means for connecting said sixth resistor to the base electrode of said fourth transistor and to the input vertex to which the collector electrode of said first and fourth transistors are connected, means for serially connecting the base electrode of said third transistor, said seventh resistor, said second inductance winding, said eighth resistor and the base electrode of said second transistor, means for serially connecting the base electrode of said first transistor, said ninth resistor, said second inductance winding, said tenth resistor and the base electrode of said fourth transistor, a load, and means for connecting said load to said third inductance winding.

19. A power supply system in accordance with claim 18 wherein an individual asymmetrically conducting device is connected across each of said seventh, eighth, ninth and tenth resistors.

20. In a power supply system, a saturable inductance device comprising first, second, third, fourth, fifth, sixth, seventh and eighth windings, a bridge circuit having four arms forming a pair of input and a pair of output vertices, means for connecting a direct-current voltage to said input vertices, means for connecting said first inductance winding across said output vertices, a load, means for connecting said second inductance winding to said load, first, second, third, fourth, fifth, sixth, seventh and eighth transistors each having base, collector and emitter electrodes, means for connecting the collector and emitter electrodes of said first and second, fourth and third, fifth and fourth, sixth and fifth, seventh and eight transistors, respectively, means for connecting said collector electrodes of said second and third transistors to one of said input vertices, means for connecting said emitter electrodes of said sixth and seventh transistors to the other of said input vertices, means or serially connecting the base electrode of said second transistor, said third inductance winding and the base electrode of said third transistor, means for serially connecting the emitter electrode of said second transistor, said fourth inductance winding and the emitter electrode of said third transistor, means for serially connecting the base electrode of said first transistor, said fifth inductance winding and the base electrode of said fourth transistor, means for serially connecting the base electrode of said sixth transistor, said sixth inductance winding and the base electrode of said seventh transistor, means for serially connecting the emitter electrode of said fifth transistor, said seventh inductance winding and the emitter electrode of said eighth transistor, means for serially connecting the base electrode of said fifth transistor, said eighth inductance winding and the base electrode of said eighth transistor, starting and stabilizing means comprising first, second, third, fourth, fifth, sixth and seventh resistors and first, second, third and fourth asymmetrically conducting devices, means for connecting said first asymmetrically conducting device to portions of said third and fourth inductance windings, means for connecting said first resistor to said portion of said third inductance winding and to the input vertex to which the collector electrodes of said second and third transistors are connected, means for connecting said second resistor to said portion of said fourth inductance winding and to the input vertex to which the emitter electrodes of said sixth and seventh transistors are connected, means for connecting said second asymmetrically conducting device to portions of said first and fifth inductance windings, means for connecting said third resistor to said portion of said fifth inductance winding and to the input vertex to which the collector electrodes of said second and third transistors are connected, means for connecting said fourth resistor to said portion of said first inductance winding and to the input vertex to which the emitter electrodes of said sixth and seventh transistors are connected, means for connecting said third asymmetrically conducting device to a portion of said sixth inductance winding and to the input vertex to which said emitter electrodes of said sixth and seventh transistors are connected, means for connecting said fifth resistor to said portion of said sixth inductance winding and to the input vertex to which the collector electrodes of said second and third transistors are connected, means for connecting said fourth asymmetrically conducting device to portions of said seventh and eighth inductance windings, means for connecting said sixth resistor to said portion of said seventh inductance winding and to the input vertex to which the emitter electrodes of said sixth and seventh transistors are connected, means for connecting said seventh resistor to said portion of said eighth inductance winding and to the input vertex to which the collector electrodes of said second and third transistors are connected.

21. A power supply system in accordance with claim 20 wherein an individual oppositely polarized asymmetrically conducting device is connected across each of said first, second, third and fourth asymmetrically conducting devices whereby decreased transistor turn-off or decay time and increased thermal stabilization are provided.

22. A power supply system in accordance with claim 20 wherein the sum of the first and second resistors, the sum of the third and fourth resistors and the sum of the sixth and seventh resistors are equal to the value of the fifth resistor.

23. In a current supply apparatus, a saturable inductance device comprising first, second, third, fourth, fifth, sixth, seventh and eighth windings, a bridge circuit having four arms comprising a pair of input and a pair of output vertices, means for connecting a direct-current voltage to said input vertices, means for connecting said first inductance winding across said output vertices, first, second, third, fourth, fifth, sixth, seventh and eighth transistors each having base, collector and emitter electrodes, means for connecting the collector and emitter electrodes of said first and second, fourth and third, fifth and fourth, sixth and fifth, seventh and eighth transistors, respectively, means for connecting said collector electrodes of said second and third transistors to one of said input vertices, means for connecting said emitter electrodes of said sixth and seventh transistors to the other of said input vertices, means for serially connecting the base electrode of said second transistor, said third inductance winding and the base electrode of said third transistor, means for serially connecting the emitter electrode of said second transistor, said fourth inductance winding and the emitter electrode of said third transistor, means for serially connecting the base electrode of said first transistor, said fifth inductance winding and the base electrode of said fourth transistor, means for serially connecting the base electrode of said sixth transistor, said sixth inductance winding and the base electrode of said seventh transistor, means for serially connecting the emitter electrode of said fifth transistor, said seventh inductance winding and the emitter electrode of said eighth transistor, means for serially connecting the base electrode of said fifth transistor, said eighth inductance winding and the base electrode of said eighth transistor, starting means comprising first, second, third, fourth, fifth, sixth, seventh, eighth, ninth, tenth and eleventh resistors, means for connecting said eighth resistor to portions of said third and fourth inductance windings, means for connecting said first resistor to said portion of said third inductance winding and the input vertex to which the collector electrodes of said second and third transistors are connected, means for connecting said second resistor to said portion of said fourth inductance winding and to the input vertex to which the emitter electrodes of said sixth and seventh transistors are connected, means for connecting said ninth resistor to portions of said first and fifth inductance windings, means for connecting said third resistor to said portion of said fifth inductance winding and to the input vertex to which the collector electrodes of said second and third transistors are connected, means for connecting said fourth resistor to said portion of said first inductance winding and to the input vertex to which the emitter electrodes of said sixth and seventh transistors are connected, means for connecting said tenth resistor to a portion of said sixth inductance winding and to the input vertex to which the emitter electrodes of said sixth and seventh transistors are connected, means for connecting said fifth resistor to said portion of said sixth inductance winding, and to the input vertex to which the collector electrodes of said second and third transistors are connected, means for connecting said eleventh resistor to portions of said seventh and eighth inductance windings, means for connecting said sixth resistor to said portion of said seventh inductance winding and to the input vertex to which the emitter electrodes of said sixth and seventh transistors are connected, means for connecting said seventh resistor to said portion of said eighth inductance winding and to the input vertex to which the collector electrodes of said second and third transistors are connected, a load, and means for connecting said load to said second inductance winding.

24. A current supply apparatus in accordance with claim 23 wherein an individual asymmetrically conducting device is connected across each of said eighth, ninth, tenth, and eleventh resistors.

25. An electric circuit for converting direct voltage to alternating voltage comprising a first and second pair of unilaterally conducting devices, each device having a conduction control element; a saturable core transformer having an input winding and two feedback windings; a source of direct voltage; one of said first pair of unilaterally conducting devices, said input winding, and the other of said first pair of unilaterally conducting devices being connected in series in the order recited to said direct voltage source to provide current flow through said input winding in one direction; one of said second pair of unilaterally conducting devices, said input winding, and the other of said second pair of unilaterally conducting devices being connected in series in the order recited to said direct voltage source to provide current flow through said input winding in a direction opposite to said one direction; and means responsive to voltages in one feedback winding for applying control potentials to the control elements of two of said unilaterally conducting devices and responsive to voltages in the other feedback winding for applying control potentials to the control elements of the remaining unilaterally conducting devices to provide alternate conduction of said first and second pairs of amplifying devices.

26. The electric circuit set forth in claim 25 wherein said unilaterally conducting devices are transistors, said one unilaterally conducting devices of each pair being of like conductivity type and of a complementary type to said other unilaterally conducting devices of each pair; and wherein one feedback winding is coupled to said one unilaterally conducting device of said first pair and to the other unilaterally conducting device of said second pair and the other feedback winding is coupled to the remaining unilateral conducting devices.

27. The electric circuit set forth in claim 25 wherein said unilaterally conducting devices are transistors; and wherein one feedback winding is coupled to a unilaterally conducting device of said first pair and the other feedback winding is coupled to a unilaterally conducting device of said second pair, and the remaining unilaterally conducting devices of each pair have their control elements coupled to the output of the unilaterally conducting device in its pair for concurrent operation of the members of each pair.

References Cited by the Examiner

UNITED STATES PATENTS

| | | | |
|---|---|---|---|
| 2,611,118 | 9/1952 | Havlick | 321—8 |
| 2,825,810 | 3/1958 | Zeidler | 331—116 |
| 2,852,730 | 9/1958 | Magnuski | 331—114 |
| 2,872,582 | 2/1959 | Norton | 307—88.5 |
| 2,948,841 | 8/1960 | Locanthi et al. | 321—2 |
| 2,968,739 | 1/1961 | Mohler | 321—2 |
| 3,014,172 | 12/1961 | Brunson | 321—44 |

FOREIGN PATENTS 803,186 10/1956 Great Britain.

OTHER REFERENCES

"Transistor Invertors and Rectifier-Filter Units," by F. Butler; published by Electronic Engineering (July 1959), pp. 412–418 relied on.

ROY LAKE, *Primary Examiner.*

SAMUEL BERNSTEIN, *Examiner.*

G. J. BUDOCK, J. KOMINSKI, *Assistant Examiners.*